May 7, 1968 S. U. GATEWOOD 3,381,786
REMOTE SPRING CLUTCH CONTROL USING OUTSIDE SPRING
Filed Aug. 1, 1966
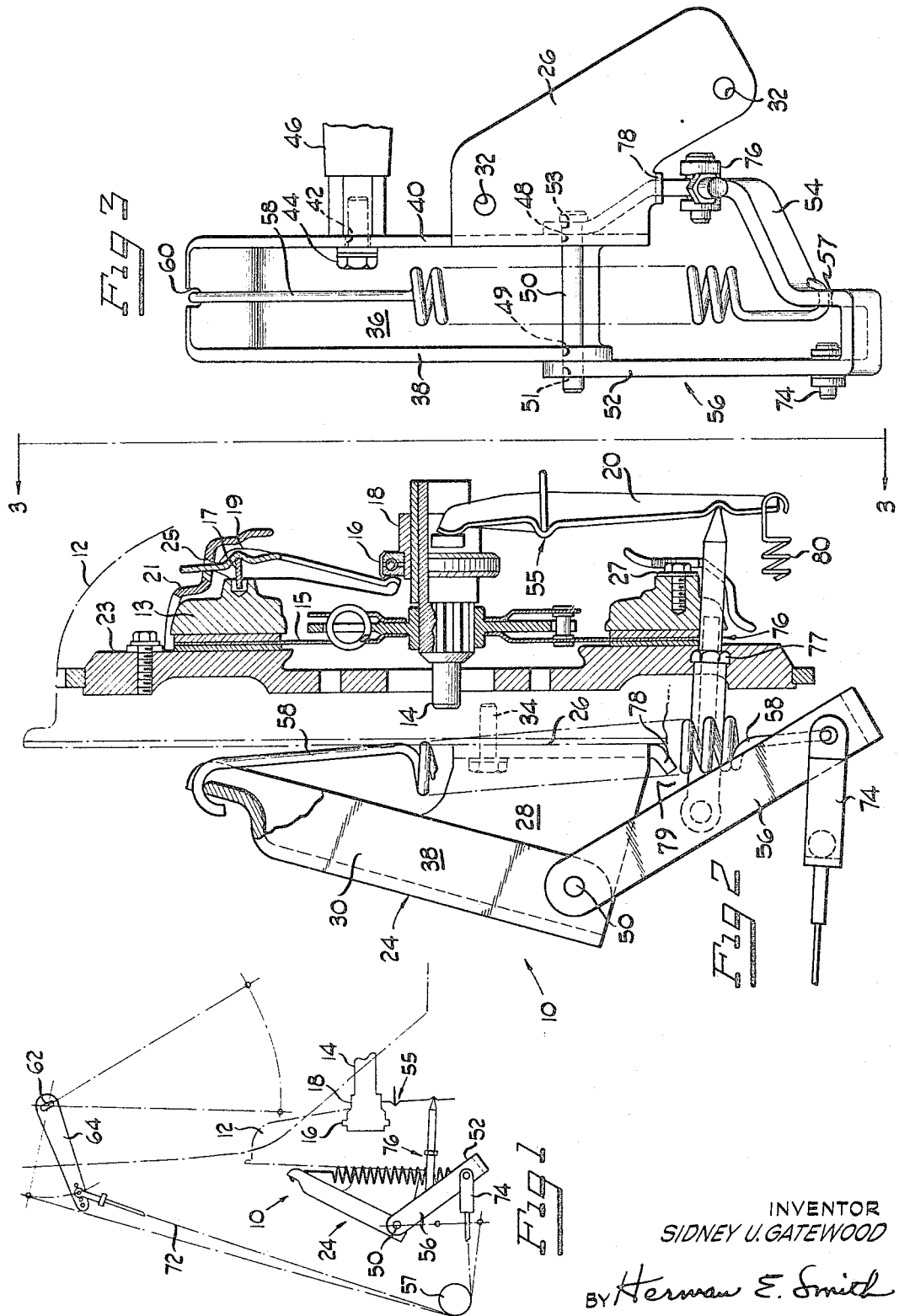
INVENTOR
SIDNEY U. GATEWOOD
BY Herman E. Smith
ATTORNEY 3,381,786
REMOTE SPRING CLUTCH CONTROL
USING OUTSIDE SPRING
Sidney U. Gatewood, Roseville, Mich., assignor to Borg-Warner Corporation, Chicago, Ill., a corporation of Illinois
Filed Aug. 1, 1966, Ser. No. 569,289
4 Claims. (Cl. 192—89)

This invention relates to clutches, and more particularly to a lever and spring assembly for use with a clutch of the remote spring type.

This invention is more particularly directed to a clutch of the remote spring type which is provided with a lever and spring assembly which may be installed as a packaged unit on the exterior portion of the bell housing.

A typical automotive clutch includes a cover plate, release levers, a pressure plate, load springs and a driven member. These clutch elements are fastened to the flywheel and are enclosed or partially enclosed in the bell housing. It is conventional practice to position the load springs between the cover plate and the pressure plate to provide a force to engage the clutch. The load spring means normally includes a plurality of springs arranged circumferentially around the clutch between the cover plate and the pressure plate. These springs normally extend parallel to the axis of rotation of the clutch.

The diameter as well as the axial dimension of a clutch assembly is normally a function of the horsepower that is to be transmitted by the clutch. Thus, as the horsepower of a vehicle increases, it is generally necessary to increase either the diameter of the clutch or the axial dimension of the clutch. It is, however, undesirable to increase either the diameter of the clutch or the axial dimension of the clutch because of space limitations in fitting the clutch into the vehicle.

A remote spring clutch comprises substantially the same elements as the aforementioned typical automotive clutch; however, it normally is of a relatively shorter axial dimension as a result of placing the load spring means in a location wherein it does not add to the axial dimension of the clutch. This is accomplished by incorporating the load spring means in the control or actuating lever linkage system in a manner such that it does not occupy space between the pressure plate and the cover plate. With this type arrangement, the load spring means normally exerts a force on the pressure plate by way of the clutch release bearing and the clutch release levers. Examples of this type of clutch may be found in U.S. Patents 2,234,459, 2,234,460, 2,275,387, 2,275,388 and 2,300,187. This type clutch has been termed a "remote spring" clutch as it utilizes a load spring which is remote or outside the clutch cover plate.

An object of the invention is to provide a lever and spring assembly for a clutch of the remote spring type which is of a packaged configuration and is adapted for use with a conventional flywheel, bellhousing, release fork, and bearing carrier assembly.

A further object of the invention is to provide a lever and spring assembly for a clutch of the remote spring type wherein the moment arm through which the load spring acts, together with the benefits achieved with a variable ratio lever arrangement minimize the clutch disengaging force (pedal effort).

A more complete understanding of the invention will be readily apparent to those skilled in the art from a reading of the specification and the drawing which illustrates a certain preferred embodiment in which:

FIGURE 1 is a schematic representation of a clutch assembly and its associated lever linkage system;

FIGURE 2 is an enlarged view of the linkage and spring assembly of the present invention in its operational environment; and FIGURE 3 is a view taken substantially on line 3—3 of FIGURE 2 with certain parts being removed for the sake of clarity.

Referring now to the drawing and, more particularly, FIGURES 1 and 2, the linkage and spring assembly of the present invention is indicated by reference numeral 10. This assembly is adapted for use with a clutch of the remote spring type which is located within a bellhousing 12. This clutch is of the axially engaging type and is adapted to transmit power from a suitable source such as an internal combustion engine or the like to an output shaft 14. The clutch includes a pressure plate 13, driven member 15, struts 17, cover plate levers 19 and a cover plate 21. The driven member 15 is interposed between the flywheel 23 and the pressure plate 13. Retractor-drive straps 27 interconnect the pressure plate 13 and the cover plate 21 and serve a function of separating the pressure plate 13 from the driven member 15 as the clutch is disengaged.

The linkage and spring assembly 10 (FIGURES 1 and 2) includes a bracket 24 comprising a mounting plate 26 (FIGURE 3), a triangular section 28 extending perpendicular to the mounting plate 26 and a channel section 30. The mounting plate 26 is formed with a pair of spaced openings 32 (FIGURE 3) each of which is adapted to receive a cap screw 34. These openings 32 are aligned with threaded apertures located in the engine flywheel housing 12.

The channel section 30 includes a base portion 36 and spaced parallel legs 38 and 40. A portion of the leg 40 is coplanar with the triangular section 28 and thus forms an extension thereof. The leg 40 is provided with an opening 42 through which extends a cap screw 44. The cap screw 44 is threadedly received in a boss 46 which may be formed as an integral part of the power plant.

The lower ends of leg 38 and leg 40 of the channel section 30, as viewed in FIGURE 3, are provided with aligned apertures 48 and 49 respectively through which passes a pivot pin 50. The pivot pin 50 also passes through openings 51 and 53 in leg 52 and leg 54 of a substantially U-shaped lever 56. The lever 56, as will be apparent, may be pivoted about the pin 50 and includes an aperture 57 for receipt of one end of load spring 58. The opposite end of load spring 58 is connected to a notch 60 in the end of the channel section 30.

An adjustable actuator rod 76 is connected at one end to leg 54 of lever 56 in spaced relation to the ends of lever 56 and at the other end to the yoke 20. The actuator rod 76 may be adjusted by turning a nut 77. By this arrangement the geometry of the lever system and thus the load exerted by the load spring on the pressure plate may be adjusted as desired.

The clutch is normally maintained in engagement as illustrated in FIGURE 2 by load spring 58 acting between a fixed member; i.e., bracket 24 and the U-shaped lever 56. The action of load spring 58 tends to rotate the lever 56 in a counter-clockwise direction about its pivot 50. This shifts the actuator rod 76 to the right which in turn rotates the yoke 20 in a counter-clockwise direction about its pivot 55. Counter-clockwise rotation of yoke 20 results in movement of the bearing sleeve 18 and bearing 16 to the left and this in turn results in a corresponding movement of the inner ends of cover plate levers 19. Movement of the inner ends of the cover plate levers 19 causes the cover plate levers 19 to pivot in a clockwise direction about points 25 on the cover plate 21 thus shifting struts 17 and pressure plate 13 to the left to confine the driven member 15 between the flywheel 23 and the pressure plate 13 to cause engagement of the clutch.

The clutch is disengaged by depressing the clutch pedal (not shown) which, in turn, rotates lever 64 clockwise about its pivot point 62. Rotation of lever 64 shifts cable 72 such that U-shaped lever 56 is rotated in a clockwise direction about its pivot 59. Movement of U-shaped lever 56 in a clockwise direction results in a corresponding movement of actuator rod 76 to the left as viewed in FIGURE 2 and this, in turn, causes yoke 20 to pivot about its pivot 55 in a clockwise direction. Clockwise movement of yoke 20 allows the bearing sleeve 18 and bearing 16 to move to the right as viewed in FIGURE 2. This enables the inner ends of cover plate levers 19 to shift to the right and as the cover plate levers 19 thus pivot in a counter-clockwise direction about point 25, the retractor-drive straps 27 complete final disengagement of the pressure plate 13 from the driven member 15.

The present invention provides an apparatus particularly suitable for use on a vehicle having an axially engaging clutch of the remote spring type. It will be appreciated the subassembly comprising the elongated bracket 24, load spring 58, U-shaped lever 56 and actuator rod 76 may be preassembled as a packaged unit and mounted as a unit in the exterior portion of the power plant such as, for example, on the exterior portion of the bellhousing 12. Mounting of the packaged unit is accomplished by the simple expedient of installing three cap screws.

The original installation of the linkage spring unit is simpler and less time consuming than the installation of the respective elements on the power plant one at a time; however, an additional benefit of using the packaged unit is achieved each time it becomes necessary to perform repair work on the clutch.

A spring 80 has one end attached to the yoke 20 and the other end (not shown) attached to arm 54 of lever 56. This spring 80 serves to maintain a constant compressive preload in the actuator rod 76. The spring also causes the yoke 20 to remain engaged with rod 76 during the period of time the clutch is being released, if for any reason, the drive straps 27 do not properly retract the pressure plate 13.

A stop means 78 is formed as part of the mounting bracket 26 to restrict counter-clockwise rotation of the lever 56 with regard to the mounting bracket 26. This arrangement enablese the subassembly—bracket 26, lever 56, load spring 58, and rod 76—to be pre-assembled prior to installation on a vehicle with a predetermined tension in the load spring 58. As the subassembly is secured to the vehicle, lever 56 may be rotated in a clockwise direction to further extend the load spring 58 until rod 76 is in a position to be engaged with the yoke 20. With the clutch in an engaged condition (which represents maximum operating counter-clockwise rotation of the lever 56 with respect to the bracket 26), there will be a predetermined clearance between the lever and the bracket as illustrated at 79 in FIGURE 2. This clearance diminishes as lining wear occurs; however, it is re-established when rod 76 is readjusted to correct for pedal free-play.

While this invention is described in connection with certain specific constructions and arrangements, it is to be understood that this is by way of illustration and not by way of limitation and the scope of this invention is defined solely by the appended claims which should be construed as broadly as the prior art will permit.

I claim:

1. A linkage and load spring assembly for a clutch of the remote spring type comprising an elongated bracket having a first end and a second end and being adapted to be mounted on a power plant of a vehicle, a lever having a first end pivotally mounted to said first end of said elongated bracket, an actuator rod pivotally secured to said lever between the ends thereof, a load spring having one end connected to said second end of said elongated bracket and an opposite end connected to said second end of said lever, means connected to said second end of said lever to cause pivotal movement of said lever with respect to said elongated bracket, and means operatively connecting said actuator rod to said clutch.

2. An apparatus in accordance with claim 1 wherein said actuator rod includes means to adjust the length thereof.

3. A clutch assembly adapted to be mounted within a housing comprising a driving member, a cover plate adapted to be connected to said driving member, a pressure plate positioned within said cover plate adapted to shift axially with respect to said driving member, a driven member interposed between said pressure plate and said driving member, a plurality of clutch levers pivotally mounted on said cover plate adapted to engage said pressure plate, a bearing assembly in operative engagement with said clutch levers effective to cause movement thereof, a yoke pivotally mounted having a first end in engagement with said bearing and having a second end, a linkage assembly including an elongated bracket having a first end and a second end and being fixedly mounted with respect to said housing, a lever having a first end pivotally mounted to said first end of said elongated bracket and having a second end, an actuator rod pivotally connected to said lever intermediate the ends thereof in operative engagement with said second end of said yoke, a load spring having one end connected to said second end of said elongated bracket and having its other end connected to said second end of said lever being operative to cause engagement of said clutch, and means in engagement with said second end of said lever to actuate said lever and thus cause disengagement of said clutch.

4. An apparatus in accordance with claim 1 wherein stop means is provided between said elongated bracket and said lever whereby said lever is restricted from rotating beyond a predetermined amount with respect to said elongated bracket.

References Cited

UNITED STATES PATENTS

| | | |
|---|---|---|
| 2,494,410 | 1/1950 | Scheidt. |
| 3,112,820 | 12/1963 | Falk. |
| 3,254,748 | 6/1966 | Smirl. |

BENJAMIN W. WYCHE III, *Primary Examiner.*